United States Patent
Trester et al.

(10) Patent No.: US 10,185,781 B2
(45) Date of Patent: *Jan. 22, 2019

(54) METHOD AND APPARATUS FOR DETERMINING BANDWIDTH REQUIRED FOR A PAGE FEATURE

(71) Applicant: CBS INTERACTIVE INC., San Francisco, CA (US)

(72) Inventors: Jason Trester, Louisville, KY (US); John Landgrave, Louisville, KY (US)

(73) Assignee: CBS INTERACTIVE INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,812

(22) Filed: May 22, 2017

(65) Prior Publication Data
US 2017/0255707 A1   Sep. 7, 2017

Related U.S. Application Data

(63) Continuation-in-part of application No. 14/718,015, filed on May 20, 2015.

(51) Int. Cl.
*H04L 29/08* (2006.01)
*H04L 12/801* (2013.01)
*G06F 17/30* (2006.01)
*H04L 12/851* (2013.01)
(Continued)

(52) U.S. Cl.
CPC .... *G06F 17/30902* (2013.01); *H04L 43/0894* (2013.01); *H04L 47/12* (2013.01); *H04L 47/2441* (2013.01); *H04L 61/6009* (2013.01); *H04L 67/02* (2013.01); *H04L 67/2828* (2013.01)

(58) Field of Classification Search
CPC ................................. H04L 67/02; H04L 47/12
See application file for complete search history.

(56) References Cited

U.S. PATENT DOCUMENTS 6,963,874 B2   11/2005   Kasriel et al.
6,973,490 B1   12/2005   Robertson et al.
(Continued)

OTHER PUBLICATIONS

WebPagetest—Website Performance and Optimization Test—webpagetest.org accessed on Feb. 17, 2016.
(Continued)

*Primary Examiner* — Shirley X Zhang
(74) *Attorney, Agent, or Firm* — Rimon, P.C.; Marc S. Kaufman

(57) ABSTRACT

A computer implemented method, a computer system, and computer code stored on tangible, non-transient media, for determining bandwidth of a page load for a specific feature associated with the page. Network traffic associated with requests of a loading of a page to be displayed on a device is monitored. Requests of the loaded page are assigned to an associated function of the page. A set parameters associated with loading of each of the plural features is determined and a scoring function is applied to each set of parameters to determine a raw score. The raw score is normalized into a performance score for the corresponding feature in accordance with a standard total performance score for the page.

14 Claims, 10 Drawing Sheets

(51) Int. Cl.
  *H04L 29/12* (2006.01)
  *H04L 12/26* (2006.01)

(56) References Cited

U.S. PATENT DOCUMENTS

| | | | | |
|---|---|---|---|---|
| 8,065,410 B1* | 11/2011 | Breen | ................... | H04L 67/025 |
| | | | | 702/182 |
| 8,286,176 B1* | 10/2012 | Baumback | ............ | G06F 9/5061 |
| | | | | 709/221 |
| 9,037,638 B1* | 5/2015 | Lepeska | .............. | H04L 67/2847 |
| | | | | 709/203 |
| 9,477,644 B1* | 10/2016 | Oertel | ................. | G06F 17/3089 |
| 2002/0188717 A1 | 12/2002 | Mushlin et al. | | |
| 2005/0257400 A1 | 11/2005 | Sommerer et al. | | |
| 2009/0313632 A1* | 12/2009 | Haenel | ................ | G06F 11/3409 |
| | | | | 718/104 |
| 2010/0088404 A1* | 4/2010 | Mani | .................... | H04L 67/125 |
| | | | | 709/224 |
| 2011/0222404 A1* | 9/2011 | Watson | ................... | H04L 47/14 |
| | | | | 370/235 |
| 2012/0066586 A1* | 3/2012 | Shemesh | ........... | G06F 17/30902 |
| | | | | 715/235 |
| 2012/0144288 A1* | 6/2012 | Caruso | .............. | G06F 17/30905 |
| | | | | 715/234 |
| 2013/0205020 A1* | 8/2013 | Broda | ................. | G06F 11/3495 |
| | | | | 709/224 |
| 2013/0212465 A1* | 8/2013 | Kovatch | ............... | G06F 17/227 |
| | | | | 715/234 |
| 2013/0249917 A1* | 9/2013 | Fanning | ................ | G06T 11/206 |
| | | | | 345/440 |
| 2016/0323186 A1 | 11/2016 | Dillon | | |
| 2016/0344603 A1 | 11/2016 | Trester et al. | | |

OTHER PUBLICATIONS

"Lynn La et aL ""Google Nexus 6 Review"", Nov. 12, 2014, http:/fwww_cnetcom/products/google-nexus-6-review/ accessed on Feb. 17, 2016."

Non-Final Office Action dated Feb. 22, 2017 received in corresponding U.S. Appl. No. 14/718,015, 15 pages.

Final Office Action dated Jul. 18, 2017 received in corresponding U.S. Appl. No. 14/718,015, 13 pages.

* cited by examiner

Fig. 3

| Fully Loaded Time | 9.395 sec. |
| --- | --- |
| Number of http Requests | 365 |
| Bytes Loaded | 2,732 KB |
| Number of Additional http Requests | 124 |
| Additional Bytes Loaded | 4,763 KB |

FIG. 10

| Service | Type | Performance Cost | Bandwidth Consumption (ms) | Request Count | Request Size (KB) | Priority Impact |
|---|---|---|---|---|---|---|
| Budget Summary | | | | | | |
| Total | All | 10,000 | 90,554 | 406 | 3,496 | 157 |
| 2017 Improvements | | | | | | |
| AMO Removal | Ads | 406 | 7,270 | 20 | 26 | 4 |
| AAM Optimizations | Ads | 159 | 2,164 | 10 | 37 | 4 |
| Proximic Removal | Ads | 193 | 933 | 1 | 2 | 18 |
| Pagefair Removal | Ads | 106 | 699 | 3 | 7 | 4 |
| Font Reduction | Content | 261 | 2,825 | 2 | 47 | 18 |
| Sprite Reduction | Content | 218 | 505 | 2 | 47 | 18 |
| 2017 Degradations | | | | | | |
| Taboola | Ads | 238 | 3,970 | 15 | 36 | 4 |
| ChartO | Ads | 56 | 37 | 1 | 1 | 4 |
| 2017 Net Results | | | | | | |
| All | All | 1,050 | 7,133 | 20 | 37 | n/a |
| 2017 Proposals and Hypotheticals | | | | | | |
| Digioh w/ Pop-up Actual 5/26 | Social | 587 | 2,476 | 19 | 553 | 1 |
| Digioh w/ Pop-up Hypo | Social | 348 | 1,500 | 11 | 300 | 1 |
| Branch Actual | Ads | 177 | 2,000 | 6 | 38 | 4 |
| Youtube iFrame | Content | 122 | 1,401 | 2 | 18 | 4 |
| Urban Airship | Content | 114 | 318 | 1 | 56 | 4 |
| Sonobi | Ads | 0 | 0 | 0 | 0 | 0 |

1010 — brace covering 2017 Improvements rows
1012 — brace covering 2017 Degradations rows
1014 — brace covering 2017 Proposals and Hypotheticals rows

METHOD AND APPARATUS FOR DETERMINING BANDWIDTH REQUIRED FOR A PAGE FEATURE

RELATED APPLICATION DATA

This application is a continuation-in-part of application Ser. No. 14/718,015 filed on May 20, 2015, the disclosure of which is incorporated herein by reference.

CODE APPENDIX

Attached hereto is a code appendix which is part of the disclosure herein.

BACKGROUND

It is well known to monitor the performance of computer system resources generally and web pages in particular. A typical web page is comprised of a myriad of http requests to various assets which are combined into a single document object model. For example, a web page can typically generate hundreds of http requests. Web browsers allow a finite number of concurrent http requests to run in parallel when a page is loaded. Therefore, rendering and other functions of the web page can require an undesirable amount of time. A web page that takes too long to render, or otherwise operates slowly, will likely create a poor user experience.

FIG. 1 is a schematic illustration of a very simple web page. The Web page is typically represented by HTML code. The HTML code can have various references to objects, such as graphics, frames, or the like, that are stored remotely in a distributed manner. In FIG. 1, HTML code 10 contains references to objects 12, 14, and 16 which can be stored on the same device as HTML code 10 or on another device. Further, object 14 references object 18. One or more of objects 12, 14, 16, and 18 can be more complex objects such as JavaScript Object Notation (JSON) objects. JSON is a language-independent data format used primarily to transmit data between a server and a web application. JSON objects can be complex and can require many data requests and responses.

Accordingly, Web pages can be very complex and there can be thousands of requests and responses that must be accomplished in order to load the page. A "waterfall" chart, which shows the cascading order and timing of http requests as a page loads, can be used to visualize data that is generated cumulatively and sequentially during a page load. Such charts can illustrate the series of actions that occur between a client computer and a server during a page load or other activity. FIG. 2 illustrates a simple example of a waterfall chart.

Each Process, 1-N, represents a request required for the page load. N can be a very high number, such as several thousand. Each request is mapped over time. Some requests occur before rendering has started and some occur after rendering has started. It can be seen that some requests are accomplished in parallel and some n seriatim. Further, many requests can be accomplished in association with a single feature of the web page. For example, one feature might be to embed a live stock feed or a video in a web page.

Website stakeholders often set time based page load goals generally measured in seconds. A typical acceptable page load time for a web page may range anywhere from 2 seconds to 10 seconds depending on the nature and purpose of the web page being served. Page load goals are established to ensure that the user experience meets predetermined expectations. In order to meet these goals, the time it takes for the browser to consider a page "document complete" must be determined. This typically corresponds to the Java Script on load event which usually happens after all content is loaded but may not include content that is triggered by JavaScript execution. All additional JavaScript executions, after document complete, and any other possible events are then added to the document complete time to determine when a page is fully loaded.

FIG. 3 is a table of web page load data. In the example of FIG. 3, the user experienced a document complete page load time of 9.395 s. During this time, 365 http requests were made and 2,732 kilobytes of data was loaded. In order for all content to fully load, an additional 124 http requests were made totaling 489 requests with an additional 2,031 kilobytes of data downloaded totaling 4,763 kilobytes.

Many of these 489 requests are able to run in parallel (or asynchronously). However, modern browsers have limits on the number of requests that can be made per domain as well as the total number of requests that can be made. Also, the browser must schedule requests to be made. These factors mean that more requests generally results in more time to load. Even though these requests may not be directly blocking another request, they are getting scheduled when other requests could be scheduled instead, and they are contributing to the total available request slots per page. Finally, if multiple requests for a feature are going through the same domain, they can block each other based on maximum limitations per domain.

Various tools and services have been developed to monitor and measure to performance of web pages, such as measuring the time for rendering a page, checking for bad links and checking for missing files. Also, it is known to process web page performance data to provide better visibility into page performance. For example, WEBPAGETEST.ORG provides "waterfall", content, and connection timing charts for any web page.

BRIEF DESCRIPTION OF THE DRAWING

The invention will be described through embodiments in which:

FIG. 3 is a table of web page load data;

FIG. 10 is a performance cost budget worksheet for a web page.

DETAILED DESCRIPTION

While devices, methods, apparatuses, and computer-readable media are described herein by way of examples and embodiments, those skilled in the art recognize that devices, methods, apparatuses, and computer-readable media are not limited to the embodiments or drawings described. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Known mechanisms for monitoring web page performance have limited applicability. For example, if a web page loads too slowly, it is difficult to determine how to modify the page to improve performance. Pragmatically, web page performance must be balanced against web page functionality. It is very difficult to determine the effect that addition or removal of a particular web page feature will have on the performance of the web page. Further, when requests run in parallel it is difficult to know the true cost of all requests associated with a particular feature on the page. The embodiments disclosed herein address this problem by, among other things, aggregating all requests associated with a particular feature whether they run synchronously or asynchronously. Loading of the page, and thus operation of the computer system, can be optimized based on the bandwidth associated with specific features of the page. Further, resources for a feature can be calculated as a "cost", e.g., a percentage of resources for the entire page. This cost can be used for "budgeting" a page load and controlling Service Level Agreement (SLA) compliance.

The term "feature", as used herein, refers to a specific function or related set of functions that can be effected through the page. The term "loading" or "load", as used herein, refers to the page being displayed to a user.

Figure 6:
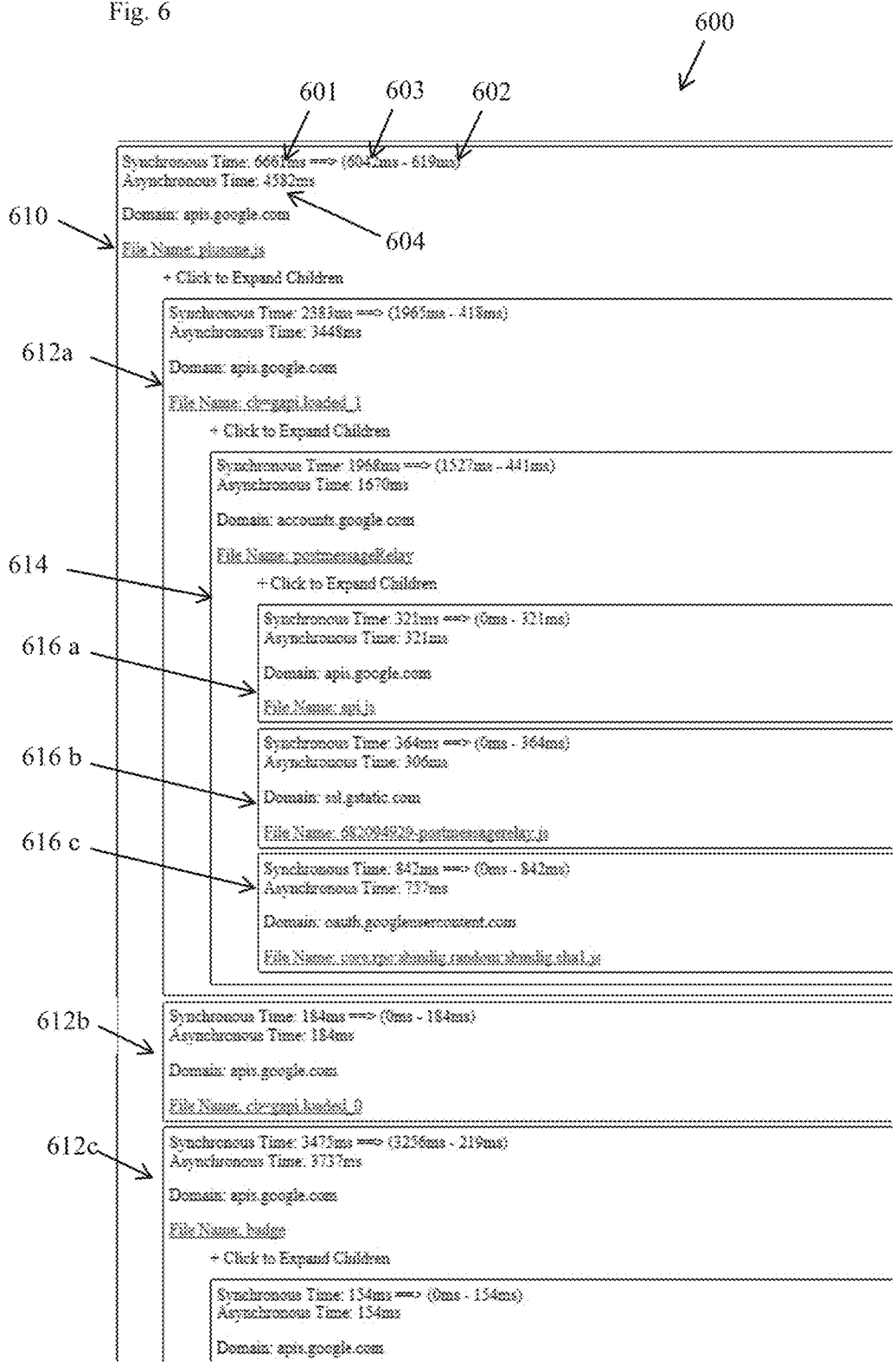
FIG. 6 is a view of a request chain data structure.

FIG. 6, discussed in greater detail below, is a grouping of requests on a page as chains, which can be used to determine that the separate requests are linked, and ultimately part of the same feature of the web page. In order to obtain the grouping, a web page is analyzed. For example, a HAR (Http ARchive) file which records all network traffic for a web page as it loads, can be analyzed. A snippet of an example HAR file is set forth below:

---

...
1,"cookies":[ ],"headers":[{"name":"Host","value":
"cnet1.cbsistatic.com"}, {"name":"Connection","value":
"keep-alive"},{"name":"Accept","value":
"text/css,*/*;q=0.1"},{"name":"User-Agent","value":"Mozilla/
5.0 (Windows NT 6.1) AppleWebKit/537.36 (KHTML, like Gecko)
Chrome/40.0.2214.93 Safari/537.36 PTST/199"},"name":"Referer",
"value":"http://www.cnet.com/products/google-nexus-
6/?adTargeting_campaign=blankads&ab=review_redesign:2:b"},{
"name":"Accept ...

---

Figure 4:
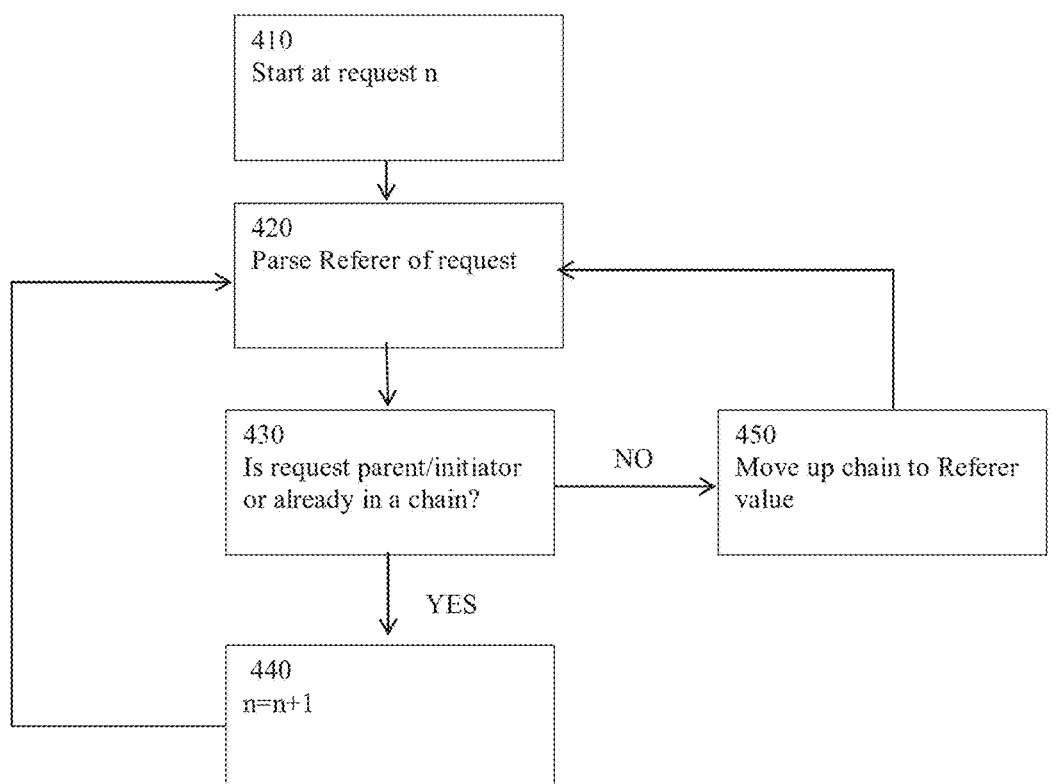
FIG. 4 is a flowchart of a method for determining request chains.

The HTTP "Referrer" element indicates which file initiated the request. In the example above, the request came from http://www.cnet.com/products/google-nexus-6/ . . . review_redesign:2:b. This information can be used to build the request chains. Code can be defined to loop through each simple request and follow the request chain upward by parsing the Referer value. FIG. 4 illustrates this process. In steps 410 and 420, request n is parsed to determine its Referer value. If there is no Referer value, the request is determined to be an initiator, i.e. parent request, in step 430. If there is a Referer value but it is a request that has previously been parsed, the chain is added to the bottom of the previously parsed chain. In either case, the process moves to step 440 where n is incremented by 1 and returns to step 420. If there is a Referer value and it is not in a request that has previously been parsed, the process moves from step 430 to step 450 in which it moves up the chain to the Referer value. In other words, chains are followed to the initiator request or to another request in the chain to place the requests in chains until all requests have been examined and placed properly in a chain.

Figure 5:
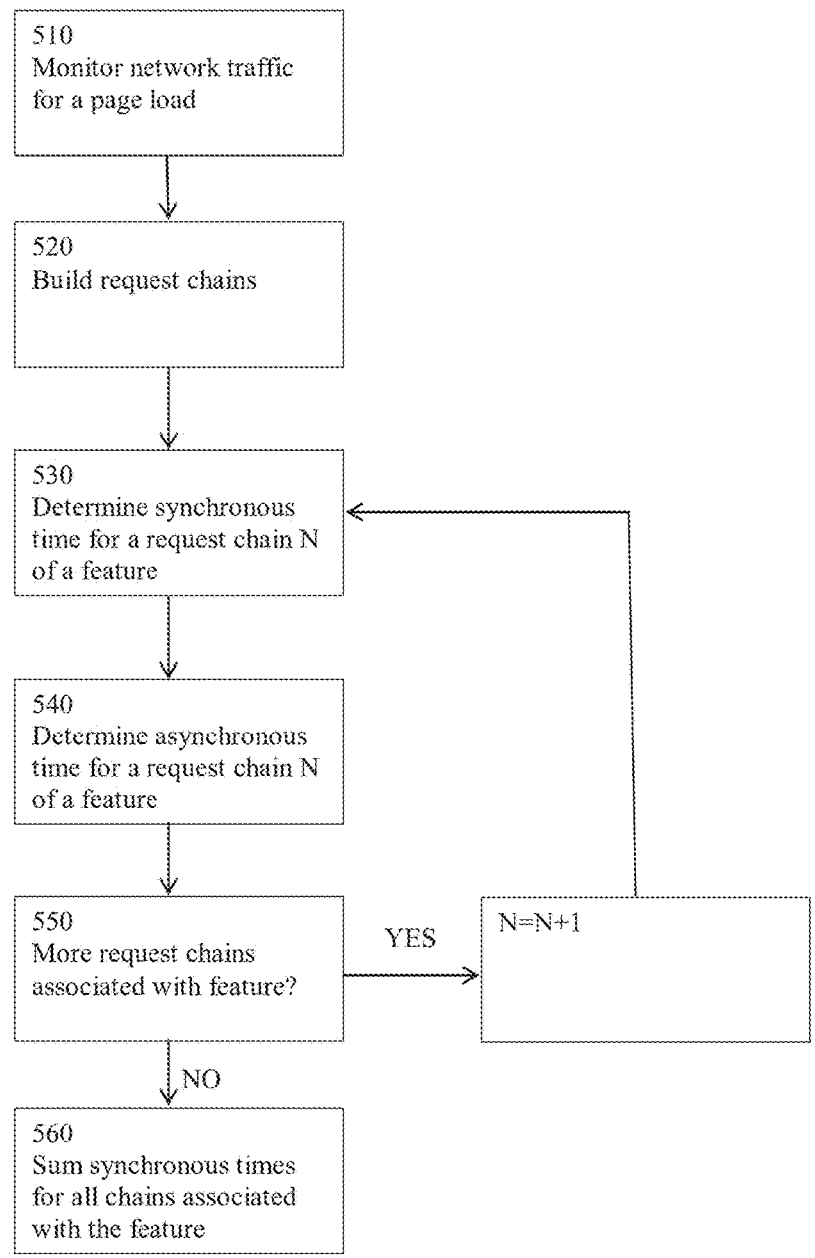
FIG. 5 is a flowchart of a method for determining time metrics for a function of a page.

FIG. 5 illustrates the overall process of determining a bandwidth metric for a feature according to an embodiment. In step 510, traffic for a page load is monitored in known manner, such as known mechanisms for creating a HAR file. In step 520, request chains are built in the manner described above with respect to FIG. 4, for example. Once the request chains are built, various metrics can be calculated for each chain. For example, Synchronous Time (step 530) and Asynchronous Time (step 540) can be calculated by monitoring the time for each request in a chain and combining them. For Synchronous Time, the individual times of the requests are summed. For Asynchronous Time, the elapsed time from the start of the chain to the end of the chain is measured. There are various known ways to measure the time of a request. The Synchronous Time metric simulates a completely serial load of all requests in the request chain, even though some of the requests may have been loaded in parallel. This is valuable, because there are a limited number of "pipes" which can be used to load parallel requests in the browser (especially mobile browsers). The Asynchronous Time is the parallel time, i.e., the difference between the end of the last request in the chain and the start of the first request in the chain.

In step 550, is determined if there are more request chains associated with a specific feature of the web page. This determination can be made by examining the domains of the requests. A database, such as a lookup table, can be constructed with known domains correlated to known functions. Ideally, there should be only one request chain associated with each feature. However, this can be circumvented by using multiple injected <script> tags or other means to start more than one request chain at the same time. The bandwidth metric for a particular feature is calculated by summing the Synchronous Times for all request chains associated with a feature in step 560.

The request chains can be stored as a data structure. FIG. 6 illustrates view 600 of a portion of a data structure for the request chains associated with the GOOGLE+™ feature of a web page. View 600 shows the requests of the chain organized in a tree structure. Element 610 is the top level request in the chain, referred to as the "parent" or "initiator" herein. It can be seen that element 610 corresponds to a request for the JavaScript™ file "plusone.js". The synchronous time for this request, including all child requests in the chain, is 6661 ms, as indicated at 601. The actual request of element 610 takes 619 ms, as indicated at 402, and the other requests in the chain take 6042 ms, as indicated at 603. The asynchronous time of request 600 has been calculated as 4582 ms, as indicated at 604.

Request 600 includes child requests 612a, 612b, 612c, and others not shown in FIG. 6. Request 612a includes child request 614 which includes child requests 616a, 616b, and 616c. It can be seen that the synchronous time and asynchronous time has been calculated for each request and the children of the request. This data can be used, along with data from any other chains associated with the function, to determine the bandwidth requirements of the function. For example, the synchronous time can be used as a bandwidth metric. The bandwidth metric can be used to determine the load times or other requirements for any specific feature of a web page or other page. Accordingly, decisions can be made regarding the tradeoff between features and user experience in a definitive manner. For example, if the request chain(s) associated with a feature take excessive bandwidth, the feature can be eliminated from the page or modified. This decision can be made with knowledge of the effects on the user experience.

Figure 7:
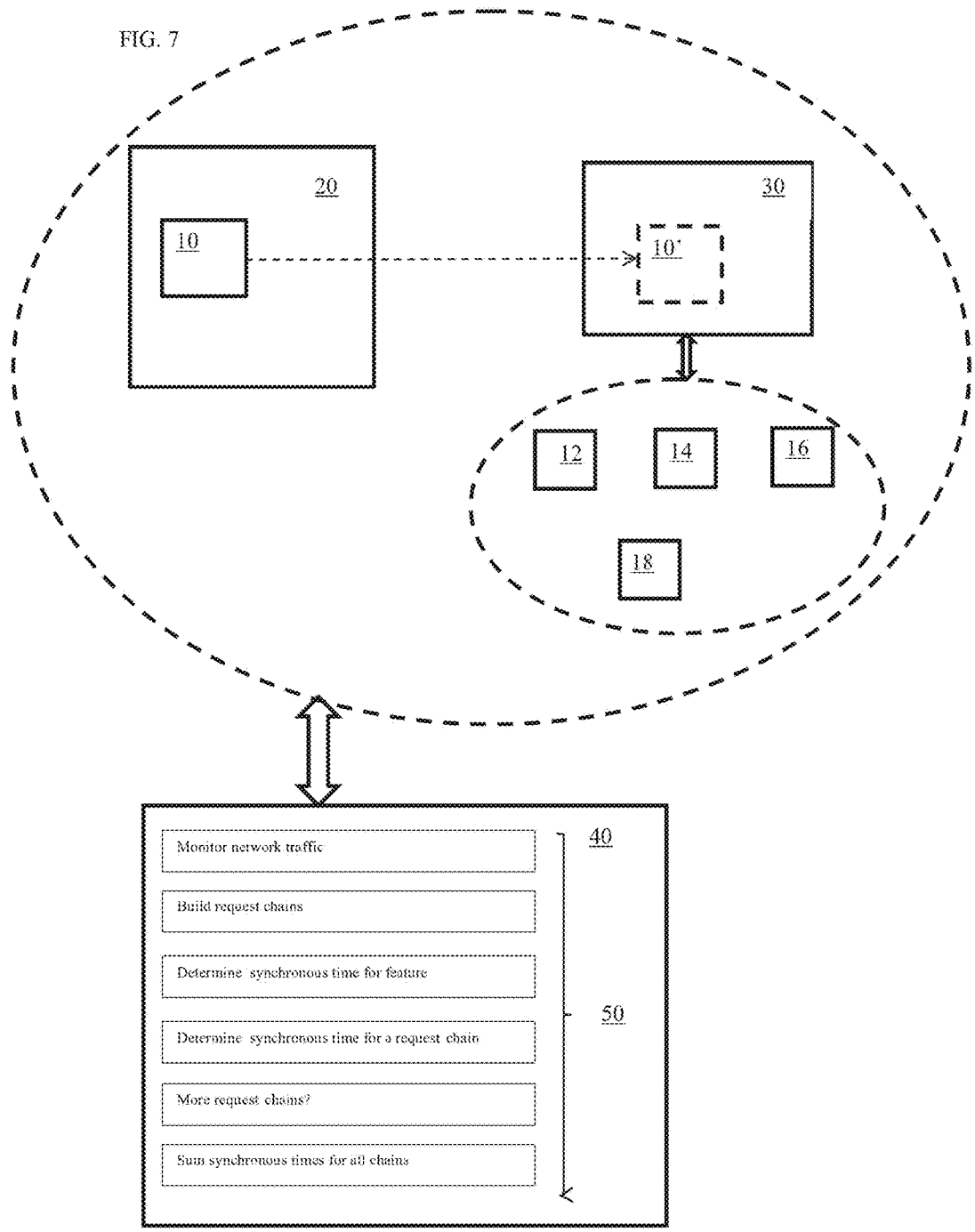
FIG. 7 is schematic of a computer system for accomplishing the disclosed embodiments.

FIG. 7 illustrates an example of a computer architecture that can be used to accomplish the methods disclosed above. The architecture includes server 20 which can be a web server and which can include one or more computing devices, client 30, which can be a web client running a browser and which can include one or more computing devices, and service computer 40 which executes the above-noted bandwidth consumption algorithms and which can include one or more computing devices.

Figure 1:
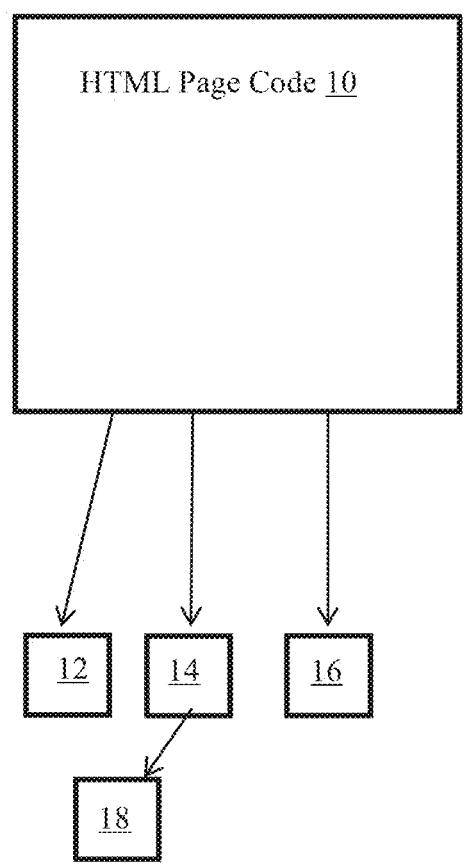
FIG. 1 is a schematic representation of a simple compound page, such as a web page written in HTML.
Figure 2:
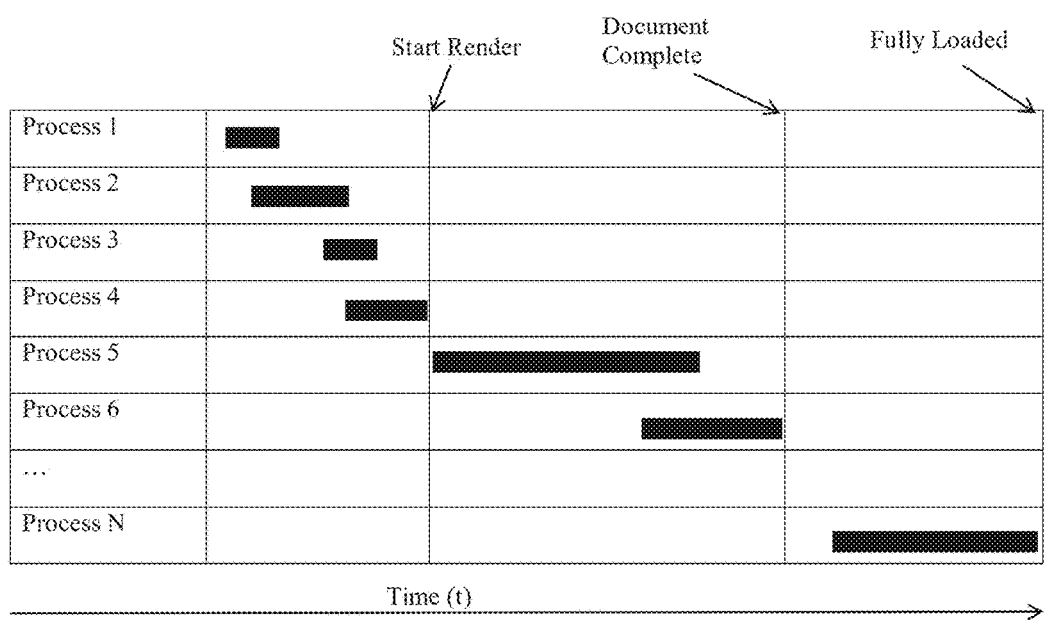
FIG. 2 is an example of a waterfall chart.

In response to client 30 requesting page 10, through an http request for example, page 10 is served to client 30 and stored at client 30 as page 10' in a known manner. Client 30 then retrieves page elements 12, 14, 16, and 18 in a known manner, as described above with respect to FIG. 1. Service computer 40 is programmed to accomplish the methods of FIG. 5 and FIG. 6 described above through a program of computer executable instructions 50 stored on tangible media in a non-transient manner. The process accomplished by service computer 40 can be accomplished in substantially real time by monitoring the page load or entirely or partially at a later time with reference to files such as the HAR file described above.

The problem of bandwidth consumption of features is rooted in the architecture and protocols of the web and similar computer networks, as described above. The embodiments disclosed herein permit construction of code for a page which can be loaded efficiently and with desired functions. Further, resources for a feature can be calculated as a "cost", e.g., a percentage of resources for the entire page or any other normalized value. This cost can be used for "budgeting" a page load and controlling Service Level Agreement (SLA) compliance.

Figure 8:
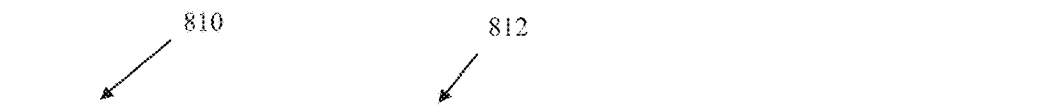
FIG. 8 is a chart showing load parameters and performance costs, as a percentage of page load resources, for various functions of a web page.

FIG. 8 illustrates web page load data for various services of a web page. Not all services of the page are shown in the interest of simplification. Each service in column 810 includes various load data including a Performance Cost, as shown in column 812. Priority Impact is the weighted cost of where and when a service or function is initialized within the load order of a page. Load order and sequencing of services based on business priorities is critical to page performance. As an example, there can be three general locations/trigger points where and when a service or function can be initialized. These include FIRST: <head> or <body> which has a weighted cost of 10, SECOND: Dom-Ready which has a weighted cost of 4, and LAST: Doc-Complete which has a weighted cost of 1. However, any appropriate location/trigger point can be used and weighted in accordance with the specific application.

As an example, the Performance Cost is calculated as a percentage of the entire resources required for a page load. For example, resources for each feature ($R_f$) can be calculated as:

$$R_f = f(BC\ RC\ RS\ PI)$$

where:
BC=Bandwidth Consumption,
RC=Request Count,
RS=Request Size, and
PI=Priority Impact.

The specific function applied to the variables can be any appropriate function that represents the feature bandwidth requirements. For example, each load data parameter can be summed with appropriate weighting factors to obtain a raw score. Once $R_f$ has been calculated for each feature of a page, total resources ($R_t$) can be calculated by summing all $R_f$s for the page. A percentage normalized Performance Cost for each feature can then be calculated as:

$$PC = (Rf/(Rf1+Rf2+Rf3 \ldots Rfn)) \times 100$$

For example, in FIG. 8, the service "GPT and DFP Creatives" consumes 35.45% of the page load resources while "Bidtellect" consumes only 2.42% of the page load resources. The ability to quantify page load resources in this manner allows the use of the Performance Cost in managing page load performance is a new way. For example, "budgets" can be managed to ensure desired service levels. This is very important since web pages are very dynamic. For, example, Bidtellect can be an external service that is not controlled by the page owner. Changes to the Bidtellect service could adversely affect page loads without knowledge of the page owner.

Figure 9:
FIG. 9 is a chart showing load parameters and normalized performance costs for a web page.

FIG. 9 is similar to FIG. 8 except that the Performance Cost has been normalized to a total of 10,000 instead of a percentage. In other words, a Performance Cost of 1000 would be equal to a percentage Performance Cost of 10%. This type of normalization is helpful in setting a baseline performance level and budget. For example, once a page is configured for an acceptable page load, improvements (reduced resources) and degradations (increased resources) can be balanced to a budget to maintain or approve the page performance notwithstanding changes to a web page.

FIG. 10 is a budget "balance sheet" for the web page corresponding to the data in FIG. 9. The effect of feature changes, or proposed changes, on resources can be calculated in the manner described above. This determined change can be accounted for in the balance sheet. For example, in FIG. 10, we can see that new improvements for the year 2017, shown at 1010, are balanced against degradations, shown at 1012, to ascertain the total Performance Cost differential. The result is that the improvements total 1334 in Performance Cost and the degradations total 294 in Performance Cost. Subtracting the degradations from the improvements yields a net 1050 in improvements. For example, a symbol or other annotation can be used to represent performance cost. Applicant uses "⸸$" as such a symbol herein.

If the normalized budget of ⸸$ 10,000 yielded an acceptable web page performance, there is room to add other functionality to the web page and still retain the acceptable performance, i.e., stay within the ⸸$ 10,000 budget. Proposed additional functions are shown in the balance sheet at 1014, with corresponding Performance Costs. These additional functions can be added to the web page in this example, without unacceptable adverse effect, if the total Performance Cost does not exceed ⸸$ 10,000.

It can be seen that the embodiments described above can be used as a scoring system to enforce usability and service level. The performance cost calculation and budgeting tool allow a mechanism for evaluating potential changes to a web page and the effects such changes will have on required resources to load that web page. Previously, the complexities of web page design and operation made this type of management virtually impossible.

Having described and illustrated the principles of the invention with reference to the described embodiments, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A computer implemented method for managing bandwidth of a page load of a page having plural features associated with the page, the method comprising:
   determining a set parameters associated with loading of each of the plural features by;
      parsing, by at least one computing device, an HTTP Archive (HAR) file indicating network traffic associated with requests of the page load of the page;
      (a) determining, by at least one computing device, if a request has a referrer value the HAR file;
      (b) if the request does not have a referrer value in the HAR file, determining, by at least one computing device, that the request is an initiating request;
      (c) if the request does have a referrer value in the HAR file, moving to the referrer value, and:
      (d) repeating steps (a) through (c) until the request is the parent initiator;
      (e) recording, by at least one computing device the requests found in the parsing step as a request chain associated with the page, and associating the request chain with a specific feature of the page;
      (f) repeating the parse and record steps for each request chain associated with a single specific feature to obtain a set of request chains associated with the single specific feature; and
      (g) selecting, by at least one computing device, the parameters from a set of request chains;
   applying, by at least one computing device, a scoring function to each set of parameters to determine a raw score; and
   normalizing, by at least one computing device, each raw score into a performance score for the corresponding feature in accordance with a standard total performance score for the page.

2. The method of claim 1, wherein the total performance score is 100 and each raw score represents the percentage of resources required by the corresponding feature.

3. The method of claim 1, wherein the total performance score is 10,000 and each raw score represents the portion of resources, out of 10,000, required by the corresponding feature.

4. The method of claim 1, further comprising:
   modifying selected features on the page;
   determining updated performance scores for the selected features on the page;
   adjusting the features to maintain the total performance score to be within a predetermined threshold range.

5. The method of claim 1, wherein the set of parameters includes BC, RC, RS, PI where: BC=Bandwidth Consumption, RC=Request Count, RS=request Size, and PI=Priority Impact.

6. The method of claim 5, wherein the scoring function ($R_f$) is calculated as $R_f$=f(BC RC RS PI), where;
   BC=Bandwidth Consumption,
   RC=Request Count,
   RS=Request Size, and
   PI=Priority Impact.

7. The method of claim 1 further comprising using the performance score as a budget for managing the addition of features, deletion of features and changes to features of the page.

8. A computer system for managing bandwidth of a page load of a page having plural features associated with the page, the system comprising:
   at least one processor; and
   at least one memory operatively coupled to the at least one processor and having instructions stored thereon which when executed by the at least one processor cause the at least one processor to:
      determine a set parameters associated with loading of each of the plural features by;
      parsing an HTTP Archive (HAR) file indicating network traffic associated with requests of the page load of the page;
         (a) determining if a request has a referrer value the HAR file;
         (b) if the request does not have a referrer value in the HAR file, determining that the request is an initiating request;
         (c) if the request does have a referrer value in the HAR file, moving to the referrer value, and:
         (d) repeating steps (a) through (c) until the request is the parent initiator;
         (e) recording the requests found in the parsing step as a request chain associated with the page, and associating the request chain with a specific feature of the page;
         (f) repeat the parse and record steps for each request chain associated with a single specific feature to obtain a set of request chains associated with the single specific feature; and
         (g) selecting the parameters from a set of request chains;
      apply a scoring function to each set of parameters to determine a raw score; and
      normalize each raw score into a performance score for the corresponding feature in accordance with a standard total performance score for the page.

9. The system of claim 8, wherein the total performance score is 100 and each raw score represents the percentage of resources required by the corresponding feature.

10. The system of claim 8, wherein the total performance score is 10,000 and each raw score represents the portion of resources, out of 10,000, required by the corresponding feature.

11. The system of claim 8, wherein the instructions further cause the at least one processor to:
    modify selected features on the page;
    determine updated performance scores for selected features on the page;
    adjust the features to maintain the total performance score to be within a predetermined threshold range.

12. The system of claim 8, wherein the set of parameters includes BC, RC, RS, PI where: BC=Bandwidth Consumption, RC=Request Count, RS=request Size, and PI=Priority Impact.

13. The system of claim 12, wherein the scoring function ($R_f$) is calculated as $R_f$=f(BC RC RS PI)), where;

BC=Bandwidth Consumption,
RC=Request Count,
RS=Request Size, and
PI=Priority Impact.

14. The system of claim 8 further comprising using the performance score as a budget for managing the addition of features, deletion of features and changes to features of the page.

\* \* \* \* \*